United States Patent Office 3,150,991
Patented Sept. 29, 1964

3,150,991
GLASS MELTING METHOD
Joseph R. Monks, Jr., Toledo, Ohio, assignor to Owens-Illinois Glass Company, a corporation of Ohio
No Drawing. Filed Mar. 20, 1962, Ser. No. 181,162
7 Claims. (Cl. 106—52)

The present invention relates to the manufacture of glass. More particularly, this invention relates to the melting operation.

As is well known in the manufacture of glass, the desired ingredients such as sand, soda, limestone, fluorspar, feldspar, nepheline syenite, aplite, dolomites, etc. (some of which contribute silicate forming oxides) are charged into a furnace and heated whereby certain known chemical reactions take place which convert the raw materials into mutual solutions of silicates and other chemical compounds. In these chemical reactions, as the raw materials are fused, gases are given off which as they proceed upwardly to escape from the solution serve the function of stirring and homogenizing the liquid melt.

Depending upon the formulation or relative proportion of the charge ingredients, a certain temperature level (e.g., 2600° F. to 2950° F.) should be maintained in order to insure homogeneity of the melt and also removal of the gaseous byproducts. Unfortunately, upon further processing of the melt, e.g., passing the melt to the apparatus for shaping and forming into the ultimate article followed by annealing, it is found that the article contains undesirable "seeds." These "seeds" are very minute gas occlusions which are unsightly and, therefore, undesirable. Also, the seeds, where excessive, are indicative of a glass which is not as strong as a glass not containing seeds. More importantly, perhaps, the presence of the "seeds" in the final cooled glass indicates that the melting operation was not carried out satisfactorily. Thus, upon checking the yield of the furnace (weight of glass per unit of time), the fuel consumed and the corresponding temperatures in the furnace, it is usually found that where "seeds" are found to be present in the ultimate glass article, the glass melting operation was inefficiently carried out, e.g., the yield will be low and the fuel consumption high. Obviously, such conditions are reflected in a higher cost and lower quality glass.

The factors which determine the presence or absence of "seeds" are not known with absolute certainty. It is believed that the seed level, which is usually expressed in number of seeds per ounce of glass, can be to a certain extent controlled by maintaining a melter temperature at a considerably high value. This, of course, requires fuel and increases the ultimate cost of the melting operation and, consequently, the cost of the glass ultimately formed, whether it be a formed container, sheet glass, fibers or the like. Additionally, a higher temperature materially reduces the life of the furnace in that the refractory walls, and particularly at the melting line, more attacked at a rate increasing sharply with temperature.

It is known that certain finely divided substances, as well as certain elements, can be added to the glass charge ingredients to act as fining agents. By the term fining agents I mean those materials which will, in general, lower the seed level in a given glass melt. Finely divided carbon or charcoal, sea coal, sugar, flour, sawdust, etc., are known fining agents. Arsenic is also a known chemical fining agent. These materials, while effective in some degrees, are not completely staisfactory and "seeds" frequently persist despite their use.

Accordingly, with the foregoing introductions it may be stated that it is an object of the present invention to provide a method of melting glass which method is effective in reducing the seed level in ultimately formed glass, thereby improving its appearance and strength.

It is another object of the present invention to provide a method of melting glass which method permits the maintenance of temperatures of melting below that normally required or necessary in order to achieve a given seed level in the ultimately formed cooled glass.

It is still another object of the present invention to provide a method of melting glass which is easily carried out, in that it does not require any extensive modifications or changes in conventional glass melting apparatus and/or procedures.

It is yet another object of the present invention to provide a method of the character described hereinabove wherein low seed level, lower melting temperatures and an increased yield can be accomplished simultaneously in accordance with a preferred teaching of the present invention.

The foregoing and other objects of the present invention will become apparent to those skilled in the art from the following detailed description taken in conjunction with the recitation of preferred embodiments in the way of actual examples as set forth hereinafter, all of which are for purposes of illustration and not limitation unless otherwise clearly apparent from the detailed description to follow or the claims appended.

In its simplest manner of expression, the present invention constitutes the discovery that in the carrying out of a glass melting operation the presence of seeds can be very substantially reduced and almost eliminated by the expedient of including, along with the usual charged ingredients added to the melting furnace, a minor amount of a metallurgical furnace by-product slag, preferably blast furnace slag.

Furnace slag, of course, is a generally wasted by-product of the operation of metallurgical furnaces operated and used to produce many metals, chiefly iron and steel. The slag is formed as a liquid on the top of the molten mass of iron or steel found in the furnace cavity. This liquid slag is usually withdrawn periodically from the furnace and is cooled and thrown away. More recently, it has been used as an additive material in the manufacture of Portland cement. Metallurgical furnace slag contains some of the glass making oxides, such as silicon, aluminum and calcium. Accordingly, it has been proposed that a furnace slag could be used as a substantial raw material ingredient in the making of glass commencing with the charging of raw material oxides to the melting operation. Furnace slag, however, is found to yield a glass of very dark (even black) color. This black coloring effect has been tolerated in the manufacture of dark colored amber glass in which the aluminum oxide content of the slag has been the determining factor favoring its use. However, prior to the present invention, slag has not been used in the melting of the non-amber glass, e.g., flint, transparent glasses or light greens, etc.

EXAMPLE I

In order to illustrate the carrying out of glass melting, in accordance with the precepts of the invention utilizing a commercial sized furnace, a conventional flint glass charge, in accordance with Table 1, was first introduced thereto.

Table 1

| Ingredient: | Amount |
|---|---|
| Sand _____lbs__ | 2200 |
| Soda ash _____lbs__ | 688 |
| Burnt lime (Ca and Mg carbonate) _____lbs__ | 216 |
| Limestone _____lbs__ | 408 |
| Nepheline syenite _____lbs__ | 190 |
| Blast furnace slag _____lb__ | 0 |
| Gypsum _____lbs__ | 24 |
| Fluorspar (65.0% $CaFl_2$) _____lbs__ | 5.5 |
| Flint cullet _____lbs__ | 700 |
| #4 colorizer (3.8% selenium, balance inert) _____ounces__ | 13 |
| #1 BMC (2.29% selenium, 0.46% $CO_3O_4$, 69% $As_2O_3$, balance inert) _____ounces__ | 13 |

The foregoing charge represents a typical transparent flint formulation used to make glass containers. The furnace used was a continuous glass melting tank of the type disclosed in F. V. Tooley, Handbook of Glass Manufacture, Ogden Publishing Company, 2nd Edition, 1957, pp. 140 and 145, in which the melter measured 38 x 21 x 4 ft. and the refiner 27 x 5½ x 3 ft. The melter area measured 794.2 sq. ft. and its daily capacity is 158.8 tons, e.g., it possesses load characteristic of 5 tons of glass output per sq. ft. of melter area. The batch, according to Table 1, was charged by a conventional 30 in. Hartford Empire dual feeder, located proximate the conventional "dog house" at one end of the melter. The charge batch was fed on a continuous basis and once the furnace had reached equilibrium, the feeding conditions remained essentially unchanged. The yield of glass from the furnace was fed to several conventional Owens rotary glass bottle machines. The furnace, as described, was heated up and the batch ingredients fused to a molten condition. It was found that at equilibrium the batch could be withdrawn at an average rate of about seventeen hundred and forty pounds (1740 lbs.) per five (5) sq. ft. of furnace area over a period of about three (3) days. The average temperature at the melter cap or crown (known in the trade as crown temperature) was found to be 2780° F. Ladle samples of the glass (puck shaped and 80 grams in weight) were removed every 8 hours, allowed to cool slowly, then weighed, cleaned, immersed in dimethylphthalate, then examined for seed level in a commercially available model of a seedscope. Over the several days involved, the seed level measured forty-four (44) seeds per ounce of glass.

By comparison, similar observations were made on the same furnace but wherein the batch ingredients were adjusted to the formulations given in Table 2 below, the principal change being the addition of blast furnace slag.

Table 2

| Ingredient: | Amount |
|---|---|
| Sand _____lbs__ | 2200 |
| Soda ash _____lbs__ | 696 |
| Burnt lime (Ca and Mg carbonate) ____lbs__ | 206 |
| Limestone _____lbs__ | 384 |
| Nepheline syenite _____lbs__ | 167 |
| Blast furnace slag _____lbs__ | 50 |
| Gypsum _____lbs__ | 24 |
| Fluorspar (65.0% $CaFl_2$) _____lbs__ | 5.5 |
| Flint cullet _____lbs__ | 700 |
| #4 colorizer (3.8% selenium, balance inert) _____ounces__ | 18 |
| #1 BMC (2.29% selenium, 0.46% $CO_3O_4$, 69% $As_2O_3$, balance inert) _____ounces__ | 13 |

The above charge formulation was achieved over a period of 10 days commencing with a relatively low blast furnace slag content of twenty (20) pounds per twenty-two hundred (2200) pounds of sand and gradually increasing it to the fifty (50) pound level.

The charge ingredients and the relative amounts, as indicated by Table 1 above, were gradually changed over a period of several days to the formulation and amounts listed in Table 2. These changes in formulation as to the amounts of soda ash, burnt lime, limestone and nepheline syenite were made in order to maintain in both formulations the same theoretical glass composition. The withdrawn ladle samples on examination as before indicated an immediate change in the seed level of the ladle samples withdrawn in the same fashion and manner as previously. The addition of from 20 to 50 lbs. of blast furnace slag per 2200 lbs. of sand was continued over a period of about two weeks. It was found with this formulation that temperature equilibrium was established at 2735° F. (average). At the same time the yield of glass over the time of the experiment was found to be 1800 lbs. per 5 sq. ft. of furnace area. Finally, the average seed level, as determined on identically withdrawn ladle samples, was found to be 16 seeds per ounce of glass. Comparison of these figures reveals that the seed level using the very minor amount (e.g., 1.13% of total batch), of blast furnace slag was only about one-third of the seed level before the addition of the blast furnace slag. It is considered most surprising that the blast furnace slag could be utilized in the production of a transparent clear flint glass and, at the same time, that the furnace melter could be so operated that the yield of the furnace in tons of glass pulled could be improved, while at the same time the temperature of the furnace could be maintained at a lower level. It can be seen that the advantages accompanying the use of the blast furnace slag were, therefore, three-fold. The seed level was improved, the yield or "pull" of the furnace was increased, and the fuel requirements of the furnace were reduced.

In general, the temperatures maintained through the furnace should be maintained within the range of about 2600° F. and 2950° F.

To further illustrate the advantage attendant the inclusion of minor amounts of blast furnace slag in with the other charged ingredients to the furnace, the formulation charge to the furnace was again adjusted by removing the blast furnace slag component, but all other conditions being maintained the same. Within two days the seed level, as determined from ladle samples (withdrawn every 8 hours), had risen to an average of about fifty-two (52) to sixty (60) seeds per ounce of glass and ultimately reached a seed level of eighty (80) seeds per ounce.

The glass resulting from the melting operation using formulation of Table 2 was subjected to certain coloring tests and it was found that the color was near ideal. The dominant wave length of the glass, according to formulation of Table 2, was found to be in the range of 571 to 573 mu, as determined by spectrophotometric analyses. The percent purity was found to fall between 2.5 to 2.8, as determined by spectrophotometric analyses. The brightness was found to be 77 to 79%, as determined by spectrophotometric analyses. These values are representative of and within commercially acceptable color specifications.

An analysis of the blast furnace slag used in the series of runs above is listed in Table 3.

Table 3

| Analyzed for— | Weight percent |
|---|---|
| $SiO_2$ _____ | 38.8 |
| $Al_2O_3$ _____ | 10.5 |
| $FE_2O_3$ _____ | 0.21 |
| $TiO_2$ _____ | 0.44 |
| CaO _____ | 38.5 |
| MgO _____ | 8.3 |
| $Na_2O$ _____ | 0.4 |
| $K_2O$ _____ | 0.6 |
| $Cr_2O_3$ _____ | 0.0080 |
| MnO _____ | 1.40 |
| $S^=$ _____ | 1.00 |
| $SO_3$ _____ | 0.1 |

As can be seen, the blast furnace slag contains many conventional glass forming oxides, such as silica, as well as aluminum, calcium and magnesium oxides. However, in view of the relatively small amount of the blast furnace slag, e.g., about 1%, these ingredients do not contribute in any material fashion to the yield of glass.

EXAMPLE II

To further illustrate the practice of the present invention, a furnace as described hereinabove in Example I was run over a period of days (18) in the melting of a Georgia green glass and during which period the formulation of the charge was varied as noted in Table 4 herebelow.

*Table 4*

|  | Control | A | B | C | D | E |
|---|---|---|---|---|---|---|
| Sand (99.92% SiO$_2$), lbs | 2,000 | 2,000 | 2,000 | 2,000 | 2,000 | 2,000 |
| Soda (58% Na$_2$O), lbs | 645 | 647 | 649 | 651 | 653 | 655 |
| Monarch Lime, lbs | 196 | 192 | 188 | 184 | 180 | 176 |
| H. C. Lime (56.19% CaO), lbs | 354 | 346 | 338 | 330 | 322 | 314 |
| Fluorspar (CaFl$_2$, 65.0%), lbs | 5 | 5 | 5 | 5 | 5 | 5 |
| Gypsum (36.8% CaSO$_4$), lbs | 22 | 22 | 22 | 22 | 22 | 22 |
| Cullet (100% SiO$_2$), lbs | 1,100 | 1,100 | 1,100 | 1,100 | 1,100 | 1,100 |
| Aplite,[1] lbs | 171 | 163 | 154 | 145 | 136 | 127 |
| Blast Furnace Slag (See Table 3 for composition analysis), lbs | | 20 | 40 | 60 | 80 | 100 |
| Blue Mix C-2 (A mixture of cobalt oxide and limestone measuring 1.6% by weight of Cobalt oxide), oz | 14 | 16.5 | 17.5 | 18.0 | 18.0 | 19.5 |
| Iron Chromite, oz | 16 | 18.5 | 18.5 | 18.5 | 16.7 | 16.0 |
| No. of days furnace operated | 7 | 2 | 2 | 2 | 2 | 3 |
| Seed Count per oz. of glass (avg.) (ladle sample) | 25.7 | 18.1 | 14.5 | 4.5 | 4.5 | 2.8 |
| Seed Count per oz. of glass (avg.) (bottle sample) | 46.0 | 21.2 | | | | |

[1] Aplite is a conventional glass charge ingredient chosen for its aluminum oxide content (24%). It is also composed of 64% silica, 5.5% CaO, 6.5 Na$_2$O, 2.6% K$_2$O and 0.43% Fe$_2$O$_3$.

The relative proportions of batch ingredients listed in this table under "Control" constitutes a fairly conventional Georgia green glass formulation. The furnace was operated on this relative ratio of charge ingredient for a period of about seven days, thus insuring that equilibrium conditions had been reached. Thereupon the formulation was changed slightly to conform to the formulation identified as "A" in Table 4. This formulation includes, it will be noted, 20 lbs. of blast furnace slag. The amounts of soda, Monarch lime and high calcium (H.C.) lime and aplite were adjusted slightly in order to yield the same theoretical glass composition in order that the formulation, according to "A," could be compared to the "Control" formulation. This was run for two days, as noted in the table, whereupon the amount of glass furnace slag was increased to 40 and corresponding changes in the formulation were made. In like fashion, after two days the amount of glass furnace slag was increased to 60, then after two days more increased to 80, then after two days at 80 increased to 100 and run at that level for three days. As before with increased amounts of slag, the amounts of lime and aplite were adjusted in order to yield the same theoretical glass compositions permitting comparison of the several formulations.

As the furnace was operated with glass being drawn from the furnace, samples of glass were withdrawn by a ladle in the form of puck shaped samples weighing approximately 90 grams. These were obtained every 8 hours from both sides of the furnace. The samples were cooled slowly to provide a degree of annealing and prevent shattering when handled. The pucks were then weighed, cleaned, immersed in dimethylphthalate and examined for seeds in a commercially available seedscope.

The seed count level (average) is also reported in Table 4. From this it can be seen that the seed count, as determined by ladle sample, measured 25.7 for the "Control" Georgia green batch formulation, not including the blast furnace slag. In contrast, glass from the formulations A, B, C, D and E show an average seed count of 18.1; 14.5; 4.5; 4.5; and 2.8, respectively. Some improvement in seed count occurred immediately since, of course, it required some time for the seed level to be influenced after the addition of the slag and the average of seed level for the formulation "A" measured 18.1, a decrease of 30%.

In order to check the results of the seed count, as determined by ladle sample, ring samples of the bottles produced from the glass taken from the furnace were checked for seed count. Eight (8) bottles were taken daily from each position of the automatic Owens bottle machine. From each bottle a ring was removed by heating the center portion of the bottle with an annular Calrod unit and thence quenching the glass, whereby a ring section broke free. The ring weighed about 10 grams. The seed counts on these rings were run on the mentioned seedscope apparatus, as before, and the results are tabulated in Table 4. It can be seen that the glass produced from the conventional Georgia green formulation yielded a seed count of 46.0 seeds per ounce of glass, as determined by the just described ring sample technique. In contrast, the average of all of the rings taken from all of the bottles taken during the time of the running, according to batch formulations "A" through "E" (thus encompassing a period of eleven (11) days), showed an average seed count of 21.2. These latter results, while not as precisely accurate as the seed count level determined on the ladle samples, do confirm the relative improvement achieved by the inclusion of the blast furnace slag in the Georgia green formulation.

The operation of the furnace over the period of time involved resulted, in addition to the reduction of seed count, in a reduction of the heat necessary to effectively melt the glass. This was determined by careful recording of temperatures at the melter top, at the melter bottom and at the bridge wall (shown on pp. 170 and 172 of the above-mentioned Tooley publication). From these determinations and others made during the course of the series of runs, it was determined that the average B.t.u./ton of glass decreased from 7.28 million B.t.u./ton of glass for the "Control" formulation to 7.13 million B.t.u./ton for the formulation "A" through "E" containing blast furnace slag. This improvement is further illustrated when it is realized that the glass production could be maintained, although the melter cap temperature was able to be dropped from a temperature of 2850° F. to 2830° F. after the addition of the blast furnace slag component into the charged ingredients. In like fashion, the bottom furnace temperature was able to be adjusted, after the addition of blast furnace slag, down from 2170° F. to 2120° F., while the bridge wall temperature was lowered from 2700° F. to 2670° F. without adversely affecting the operation of the furnace or the yield of glass.

The cooled glass, according to the formulations of Table 4, was found to fall well within specifications on the basis of spectrophotometric color determinations. The method used in this test was that prescribed by the International Commission on Illumination and described in "Handbook of Colorimetry" by Hardy (1936). The method provides a measurement of color brightness, purity and the dominant wave length (mu). Thus, the determinations on the glass produced, according to the method referred to, revealed that the dominant wave length fell between 542 mu max. and 525 mu min. The percent purity ranged from 4 down to 2.5. The brightness ranged during the series of runs from a minimum value of 75.3% to a maximum value of 79%.

The foregoing description of the furnace operation carried out for 18 days, both with the introduction of a blast furnace slag and in the absence of a blast furnace slag, demonstrate the improvements in the ultimate glass which is produced in terms of the improved visual characteristics, as indicated by the lower level of seed count. The test program also demonstrated, as evidenced in the results noted above, that the improvement in the physical operation of the furnace was reflected in fuel efficiency and resulting lower cost. The blast furnace slag used in the above series was the same as that used in the previous series (e.g., Example I).

The proportion of blast furnace slag depends in some measure upon the particular blast furnace slag composition used. Thus, while the majority of blast furnace slags tested yielded in a composition analysis very similar in that given in Table 3, the relative amount of the slag necessary to achieve the particular desired result varied. As little as about 0.01% is effective in effecting a lowering of the seed count. Furthermore, the blast furnace slag may constitute up to about 6½% by weight of the total batch charge and still effect an improvement in furnace operation. Most ideally in order that the optimum balance of properties be achieved, the amount of blast furnace slag should be maintained within the foregoing range.

Preferably, the blast furnace slag for most optimum use in the practice of the present invention should be present in the form of relatively small particles. Most preferably, the blast furnace slag added to the slag should be within a particle size range of from 5 mesh to 200 mesh. Most ideally in order to achieve the optimum in improvement, the particle size of the blast furnace slag should fall within the range 20 mesh to 100 mesh.

The exact nature of the phenomenon which occurs and which permits the attainment of the very desirable results noted is not known. It is believed quite surprising that a substance of such diverse ingredients such as blast furnace slag which is known to produce a black glass, if anything, could be successfully used as a very efficient fining agent in the melting of the glass of the types illustrated by the foregoing description. It is further surprising that such a very small amount of blast furnace slag would permit the attainment of such materially improved operation.

The use of blast furnace slag to beneficially effect reductions in seeds, improvement in fining, reduction in fuel requirements, or increase in yield from a given capacity furnace, cannot be extended to all glasses. It has been found, however, that the melting of glasses, and particularly soda lime glasses, which are relatively low in color due to the oxidized state of certain normally color effecting elements such as iron and sulfur, is improved by the inclusion of blast furnace slag.

The practice of this invention finds particular utility in those glasses wherein any iron and sulfur are in the final glass analysis in an oxidized state (e.g., ferric and sulfate) or substantially so and in certain maximum amounts. With respect to iron containing glasses, such as certain light absorbing flat glass, the melting is improved with respect to glasses having a final analysis of not more than 0.5% iron, principally oxidized. The generally colorless soda lime glass (including bottle and flat) to which the invention particularly pertains should have an iron content of less than 0.15% by weight, as determined by analysis of the final glass. The extremely low color to colorless bottle type glasses to which the invention most particularly pertains are those having an oxidized iron content of less than 0.05%.

The method in accordance with this invention is most efficacious with respect to those relatively colorless soda lime glasses which contain, as analyzed, not less than 0.1% sulfate, usually calculated as $SO_3$.

The blast furnace slag will also operate as an effective fining agent in the melting of emerald green glass and champagne green glass.

The slag for use in accordance with this invention must be a blast furnace slag since slags from "open hearth" metallurgical operations, as for example by-products of steel manufacture and known as "open hearth slags," are not operable or usable as fining agents in the practice of the present invention. Thus, a series of runs, similar to those described above but substituting "open hearth slag" for the blast furnace slag, yielded a glass which was completely unsatisfactory in that very visible specks are observed which detract not only from the visible appearance of the glass but also constitute actual defects and serve as focal points of discontinuity, whereby the physical strength of the glass is seriously affected.

While there is no intent to be bound by any explanation of a theory by which the method herein disclosed may operate, it is suspected that the improvements may be the result of the fact that the blast furnace slag contains finely divided sulfides usually present in the form of the sodium or calcium sulfide. Certainly, these blast furnace slags have proven to be much more effective in the gaining of the effects and improvements noted than the conventional refining agents, such as sea coal, charcoal, sugar, flour, sawdust, etc. It is further suspected that the improved results may occur by a desolubilizing action of the sulfide upon the gases given off during the complex oxide silicate forming reactions taking place during the fusion and melting of the glass.

As many apparently widely different embodiments of this invention may be made without departing from the spirit or the scope thereof, it is to be understood that the invention is not limited to the several specific embodiments thereof disclosed except to the extent necessitated by the appended claims.

I claim:

1. The process of melting glass forming ingredients to form a final glass which comprises heating and melting said glass forming ingredients at a temperature of from about 2600° F. to about 2950° F. while in the presence of blast furnace slag in an amount ranging from 0.01 to 2.0% to thereby materially reduce the presence of seeds in the finally formed glass.

2. The method of reducing "seed" content of a relatively colorless soda-lime glass during the melting stage which comprises combining the soda-lime, glass-forming ingredients in appropriate amount that the sulfate content is not less than 0.1% by weight, adding to the ingredients 0.1 to 6.5% by weight of blast furnace slag and heating said composite at a temperature in the range of from 2600° F. to 2950° F. until molten, whereupon the molten glass can be withdrawn and formed into articles of improved strength and appearance.

3. The method of reducing "seed" content of the relatively colorless soda-lime glasses during the melting stage which comprises combining batch ingredients selected to yield a colorless soda-lime glass, adding to the ingredients 0.1 to 6.5% by weight of blast furnace slag and heating said composite at a temperature in the range of from 2600° F. to 2950° F. until molten.

4. The method of reducing "seed" content of a relatively colorless soda-lime glass during the melting stage which comprises combining the soda-lime glass-forming ingredients in appropriate amount that the sulfate content is not less than 0.1% by weight, adding to the ingredients 0.1 to 2.0% by weight of blast furnace slag and heating said composite at a temperature in the range of from 2600° F. to 2950° F. until molten, whereupon the molten glass can be withdrawn and formed into articles of improved strength and appearance.

5. The method of reducing "seed" content of the relatively colorless soda-lime glasses during the melting stage which comprises combining batch ingredients selected to yield a colorless soda-lime glass, adding to the ingredients 0.1 to 2.0% by weight of blast furnace slag and heating said composite at a temperature in the range of from 2600° F. to 2950° F. until molten.

6. In the method of melting an essentially colorless soda-lime glass, the improvement of reducing the "seed" content thereof by the expedient of combining glass forming ingredients for a soda-lime glass in such amount as to yield a sulfate content of not less than 0.1% by weight, adding to the ingredients 0.1 to 6.5% by weight of blast furnace slag and heating said composite at a temperature in the range of from 2600° F. to 2950° F. until molten.

7. The method of reducing "seed" content of the relatively colorless soda-lime glasses during the melting stage which comprises combining batch ingredients selected to yield a colorless soda-lime glass, adding to the ingredients 0.1 to 6.5% by weight of blast furnace slag of a particle size within the range of 5 to 200 mesh and heating said composite at a temperature in the range of from 2600° F. to 2950° F. until molten.

References Cited in the file of this patent

FOREIGN PATENTS

| 16,018 | Great Britain | of 1893 |
| 576,579 | Great Britain | Apr. 10, 1946 |

OTHER REFERENCES

Glass Industry, March, 1935, page 84, "Blast Furnace Slags in Glass Making."

Badger: Glass Industry, vol. 20, No. 6 (1939), (pages 231–233).